United States Patent [19]
Carlton

[11] 3,967,707
[45] July 6, 1976

[54] LIQUID DAMPERS
[75] Inventor: Quinton Healey Carlton, Leamington Spa, England
[73] Assignee: Oleo International Holdings Limited, Leamington Spa, England
[22] Filed: Nov. 21, 1974
[21] Appl. No.: 525,833

[30] Foreign Application Priority Data
Nov. 21, 1973 Germany .......................... 53938/73

[52] U.S. Cl. .............................. 188/284; 188/298; 188/315; 188/318
[51] Int. Cl.² ......................... F16F 9/19; F16F 9/48
[58] Field of Search .......... 188/284, 298, 315, 318, 188/282, 297; 267/DIG. 2

[56] References Cited
UNITED STATES PATENTS
2,107,974 2/1938 Bechereau et al. ................. 188/318
3,076,643 2/1963 Bittel ............................. 267/DIG. 2

FOREIGN PATENTS OR APPLICATIONS
154,924 11/1938 Germany ........................... 188/318
1,115,649 1/1956 France ............................. 188/318

Primary Examiner—George E. A. Halvosa
Attorney, Agent, or Firm—Stevens, Davis, Miller & Mosher

[57] ABSTRACT

A liquid damper comprises a piston head which slides within a cylinder and which is carried by a piston rod which slides within an annular gland at one end of the cylinder. A passage which includes a damping valve connects the annular cylinder space to a liquid reservoir so that liquid displaced from the annular cylinder space by movement of the piston in either direction is fed through the damping valve to the liquid reservoir. The liquid reservoir is connected to the other cylinder space through a non-return valve. A groove which varies in area along its length, extends partway along the piston rod. When the groove extends through the annular gland, some of the liquid displaced from the annular cylinder space is directed to the reservoir which surrounds the cylinder through the groove which thereby functions as a by-pass around the damping valve for that liquid so that the damping characteristics of the damper, which are related to the resistance to flow through the damping valve that is offered by that valve, is dependent upon the position of the piston head within the cylinder. The piston rod is connected to the outer wall of the reservoir by a convoluted bellows and a radially deformable annular membrane. The groove may be helical and may be one of a number of such grooves.

23 Claims, 17 Drawing Figures

LIQUID DAMPERS

This invention relates to liquid dampers of the kind in which the damping characteristics are determined primarily by the resistance to flow of liquid offered by a damping valve through which passes liquid displaced from one side to the other of a piston head sliding in either direction in a cylinder.

British Pat. Specification No. 1,229,880 describes and claims a liquid damper of the kind referred to in which the damper characteristics can be varied, to deal with changes in vehicle weight, by employing an externally produced signal acting on the damping valve, the said signal being derived from a mechanism responsive to variations of the weight of the vehicle.

The employment of such an externally produced signal adds considerably to the cost of the damper and involves external connections, such as piping to carry liquid, which are vulnerable to damage, and it is the object of the present invention to provide a liquid damper of the kind referred to in which the damping characteristics are dependent on the axial position of the piston head in the cylinder so that since the mean position of the piston head in the cylinder will vary with the vehicle weight, the damping characteristics will also vary with said weight.

Another object of this invention is to provide an effective fluid tight connection between the piston rod and the outer wall of a reservoir of a liquid damper of the kind referred to which permits reciprocal movement of the piston rod relative to the body structure that defines the reservoir outer wall, whilst effectively sealing against leakage of liquid from the cylinder and which does not incorporate a dynamic seal arrangement between the piston rod and the associated cylinder.

Briefly the present invention comprises a liquid damper of the telescopic type. The damper comprises body structure, which defines a cylinder and a liquid reservoir which surrounds the cylinder, and a piston which comprises a piston rod with a piston head mounted at one end thereof. The piston head slides within the cylinder and the piston rod slides within an annular gland, which is mounted at one end of the cylinder, so that an annular cylinder space is defined between the piston head and the annular gland. A passage in the body structure connects the annular cylinder space to the liquid reservoir which is connected to the cylinder space on the other side of the piston head through a non-return valve in the end wall of the cylinder remote from the annular gland. A damping valve is provided in the passage between the annular cylinder space and the liquid reservoir. The piston head includes a non-return valve which permits liquid to flow to the annular cylinder space from the other side of the piston head. A groove is formed in the piston rod so that, at least in some positions of the piston rod, it extends through the annular gland and provides a by-pass passage to the reservoir for liquid which is displaced from the annular cylinder space by sliding movement of the piston head in either direction within the cylinder so that, when the groove extends through the annular gland, not all the liquid displaced from the annular cylinder space is passed to the liquid reservoir through the damping valve. The cross-sectional area of the groove varies so that the area of the by-pass passage varies with change of position of the piston head in the cylinder. The piston rod is connected by a deformable annular wall to that part of the body structure which defines the outer wall of the reservoir. The deformable wall may comprise a convoluted bellows which has one end connected to the piston rod and the other end connected by a radially deformable annular membrane to the body structure. The groove in the piston rod may be a helical groove which extends around the piston rod. There may be a number of such helical grooves arranged in the manner of a multi-start thread.

Examples of liquid dampers which embody this invention will be described now with reference to the accompanying drawings, of which.

Figure 1A:
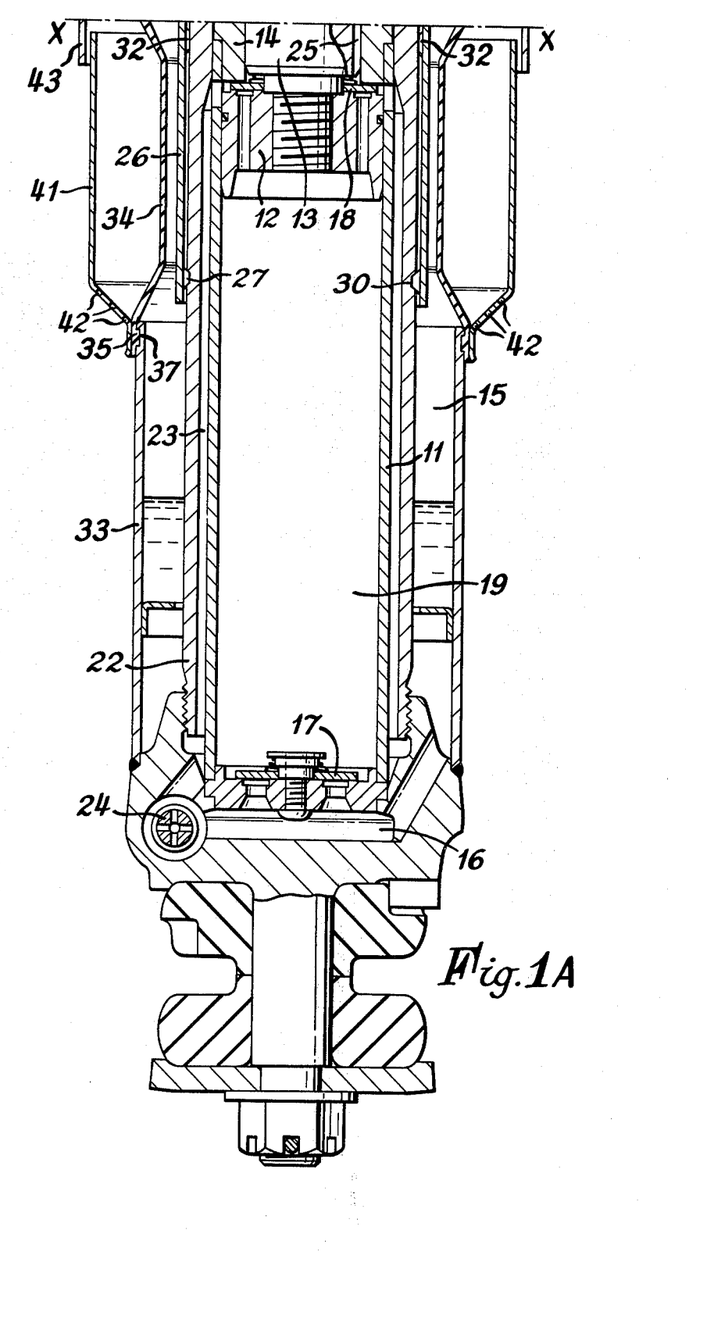
FIGS. 1A and 1B together comprise a longitudinally sectioned elevation of one embodiment of liquid damper according to this invention which is shown in its fully extended condition, the plane X—X in the two drawings being the common plane.
Figure 1B:
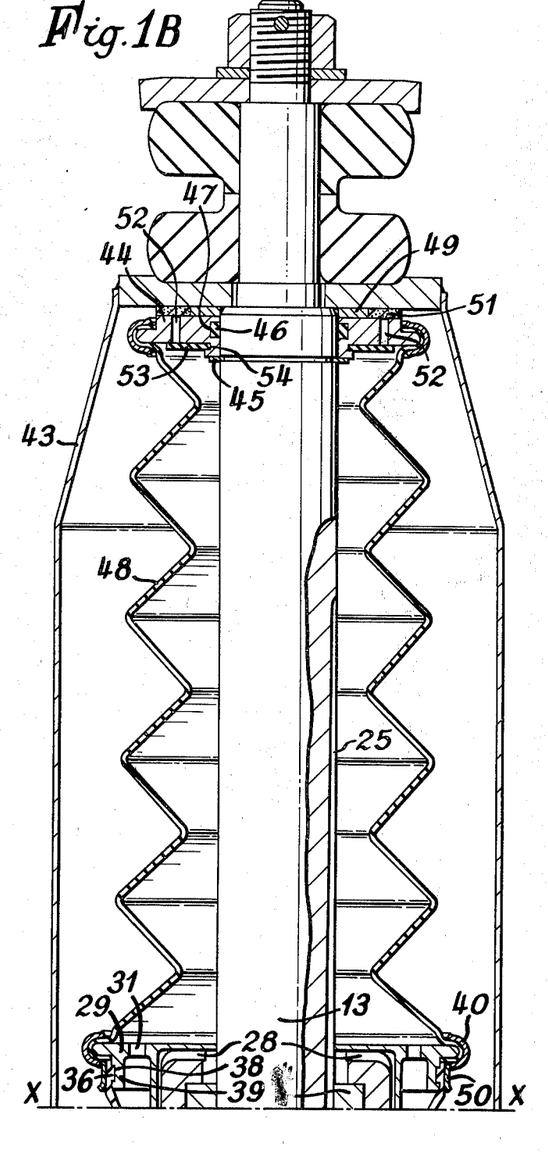
Figure 2:
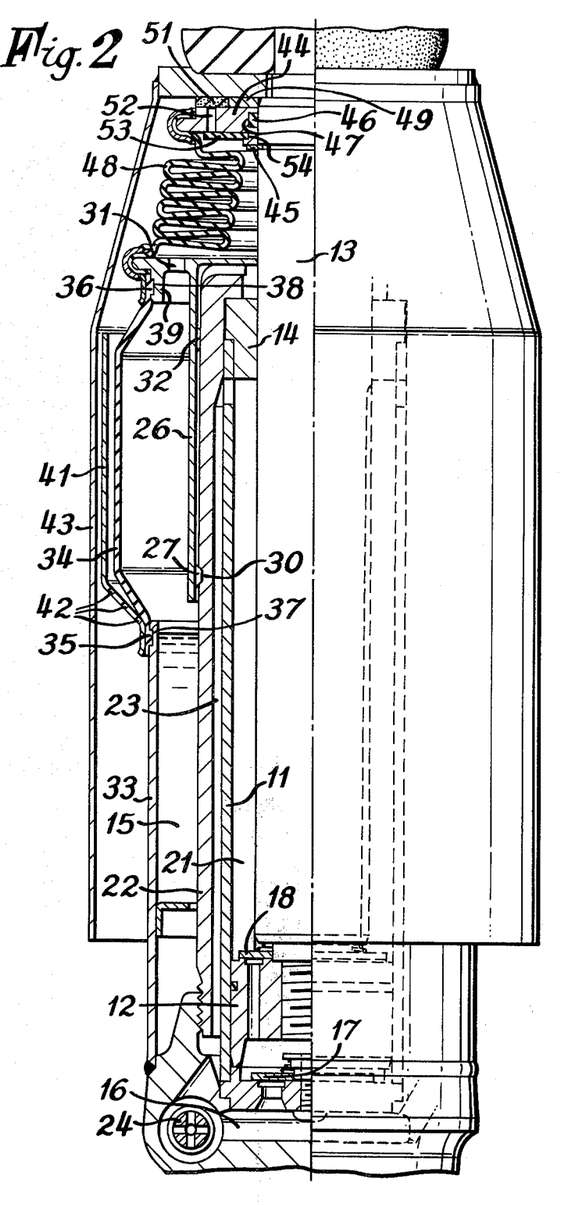
FIG. 2 is a half sectioned side elevation of the liquid damper shown in FIGS. 1A and 1B which is shown in its contracted condition and from which parts of the end fittings are cut away for convenience.

FIGS. 1A, 1B and 2 show a liquid damper which comprises a cylinder 11 in which is slidable a piston head 12 mounted on a piston rod 13 which passes through an annular gland 14 at one end of the cylinder 11. The other end of the cylinder 11 is closed. An annular liquid reservoir 15 encircles the cylinder 11 and is freely connected to a chamber 16 at the end of the cylinder 11 remote from the gland 14, the chamber 16 being connected to the closed end of the cylinder 11 through a one-way valve 17 which allows liquid to flow into, but not out of the cylinder 11. A further one-way valve 18 in the piston head 12 allows liquid to flow from the cylinder space 19 between the piston head 12 and the closed end of the cylinder 11 at which the chamber 16 is situated to the annular cylinder space 21 (see FIG. 2) around the piston rod 13 on the opposite side of the piston head 12, but prevents flow in the opposite direction. The cylinder space 19 (see FIG. 1A) is of the full cross-sectional area of the cylinder 11.

The body structure of the liquid damper also includes a tube 22 which surrounds the cylinder 11 and forms the inner wall of the reservoir 15. The annular space between the tube 22 and the cylinder 11 defines a passage 23 which is connected to the annular cylinder space 21 adjacent the gland 14 and which leads to the inlet of a damping valve 24 such as is described in British Pat. Specification No. 1,229,880. Liquid from the passage 23 passes to the chamber 16 at the end of the cylinder 11 through the damping valve 24.

Thus, on the outward stroke of the piston head 12, liquid is displaced from the annular cylinder space 21 due to the decrease in volume of the latter, and passes through the damping valve 24, and on the inward stroke of the piston head 12, although the volume of the annular cylinder space 21 is increasing, a greater volume of liquid than can be accommodated by that increase in volume is passing through the piston head 12, so that on this stroke also liquid is displaced from the annular cylinder space 21 through the damping valve 24.

The piston rod 13 is formed with a longitudinally extending groove 25 which extends axially from the piston head 12 along approximately two thirds of the length of the piston rod 13. Thus, when the piston head 12 is near the inward end of its stroke (as shown in FIG. 2), the groove 25 is wholly within the cylinder 11, but at other parts of the stroke the groove 25 extends through the gland 14 and provides a passage to the reservoir 15 which, together with the reservoir 15, serves as a by-pass passage to the chamber 16, the by-pass passage being in parallel with the passage 23 through the damping valve 24. The cross-sectional area of the groove 25 varies along the length of the groove decreasing progressively in the direction away from the piston head 12. Thus the effective cross-sectional area of the by-pass passage increases as the piston head 12 moves outwardly, enabling a greater proportion of the liquid displaced from the annular cylinder space 21 to pass through the by-pass passage, so that the degree of damping provided is reduced. It will be apparent that, since, with decrease of the weight of the vehicle, the piston head 12 operates in a part of the cylinder 11 nearer to the outer end of its stroke, the degree of damping is automatically decreased as the weight of the vehicle decreases. An annular cup-shaped component 26 is fitted coaxially over the end of the tube 22 remote from the damping valve 24. The piston rod 13 passes through the central aperture of the base of the cup-shaped component 26 with a negligible clearance therebetween. Inwardly directed angularly-spaced pips 27 are formed on the inner surface of the cylindrical side wall of the cup-shaped component 26 adjacent to the brim thereof. The pips 27 engage within an annular groove 30 formed in the outer wall of the tube 22 so as to locate the cup-shaped component 26 axially and radially with respect to the tube 22, the base of the cup-shaped component 26 being in abutment with the end of the tube 22 remote from the damping valve 24 and an annular clearance being defined between the tube 22 and the cylindrical side wall of the component 26. A number of radial slots 28 are formed in the end surface of the tube 22 which abuts the base of the component 26. The slots 28 define radial passages through which an annular space which is defined between the annular gland 14 and the base of the cup-shaped component 26 and which is bounded by the end of the tube 22 communicates with the annular clearance between the tube 22 and cylindrical side wall of the component 26. The base of the component 26 is projected radially outwardly to define an annular flange 29. A number of holes 31 are formed in the annular flange 29. The size of the holes 31 is such that air can flow freely through them from one side of the flange 29 to the other. Additional support and radial location for the component 26 is provided by a further ring of pips 32 which are formed in the inner surface of the cylindrical sidewall of the component 26 and which abut the outer surface of the tube 22. The cup-shaped component 26, including the annular flange 29, comprises a single plastics moulding The external wall of the reservoir 15 comprises a rigid cylinder 33 which is welded at one end to the main part of the body structure that is adjacent to the closed end of the cylinder 11 and which extends towards the annular flange 29. An annular membrane 34 of flexible and impermeable sheet material, such as rubber, has a rectangular section rib 35, 36 formed on its inner surface at each end. The rib 35 is located within a correspondingly-shaped annular groove 37 which is formed in the outer surface of the cylinder 33. The rib 36 is located within a correspondingly-shaped annular groove 38 which is formed in the outer surface of a cylindrical rim 39 which projects axially from the annular flange 29 in the direction towards the damping valve 24. The material of the end portions of the membrane 34 is thicker than is the material of the cylindrical centre portion and each end portion is connected to the central portion by an intermediate portion which has a progressively reducing material thickness. The membrane 34 is moulded so that the diameter of its thin central section normally is less than the diameter of its thicker end portions. An annular shield 41 of sheet metal surrounds the annular membrane 34. The shield 41 is tapered inwardly at the end which is nearer to the reservoir 15 and that end is a tight fit around the adjacent end of the annular membrane 34 so that it clamps the annular membrane 34 in position upon the cylinder 33 and is supported thereby. A number of holes 42 are formed in the tapered portion of the annular shield 41.

The piston rod 13 carries a cup-shaped shield 43, the rim of which overlaps and surrounds the annular shield 41. A rigid ring 44 is mounted rotatably upon the piston rod 13 inside the cup-shaped shield 43. A circlip 45 retains the rigid ring 44 against movement along the piston rod 13 away from the base of the cup-shaped shield 43. A rubber 'O' ring 46 housed within the annular groove 47 formed in the inner surface of the rigid ring 44 engages the piston rod 13 and seals the joint between the rigid ring 44 and the piston rod 13.

A convoluted bellows 48 has one end clamped to the outer periphery of the rigid ring 44 and the other end clamped to the annular flange 29 by an arcuate section annular clip 40. The membrane 34 is clamped to the cylindrical rim 39 by a cylindrical clamping ring 50. Thus an airtight joint is formed between the bellows 48 and the membrane 34. The rigid ring 44 is mounted rotatably upon the piston rod 13 to permit rotation of the piston rod 13 in the cylinder 11 without twisting the bellows. A thrust bearing 49, in the form of an annular disc of a suitable low friction plastics material such as polytetrafluoroethylene, is provided between the rigid ring 44 and the base of the cup-shaped shield 43. An annular disc 51 of filtering material, such as open cell polyurethane is disposed between the rigid ring 44 and the base of the cup-shaped shield around the thrust bearing 49. Holes 52, which are provided in the rigid ring 44, open into the part of that ring 44 which is covered by the ring 51 of filtering material. A non-return valve 53, in the form of a rubber ring which is engaged at its inner peripheral edge within an outwardly-opening annular groove 54 formed in the rigid ring 44 and which normally covers the inner ends of the holes 52, allows air from the interior of the cup-shaped shield 43 to pass through the filtering material and the holes 52, into the annular space defined within the convoluted bellows 48 and from there, through the holes 31 to the reservoir 15, but prevents flow in the opposite direction.

The inside diameter of the convoluted bellows is as close as is practicable to the diameter of the piston rod 13 so that the volume of the annular space within the bellows 48 is minimised.

The damper is mounted on the vehicle for use with its longitudinal axis substantially vertical although it can be used if that axis makes an acute angle of up to 45° with the vertical. The reservoir 15 is only partly filled with oil, air being contained within that reservoir 15 above the oil.

Figures 3, 4:
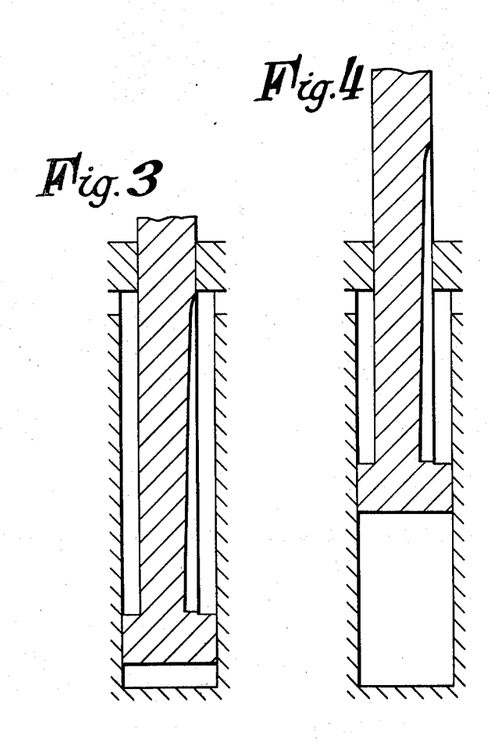
FIGS. 3, 4 and 5 are diagrams showing the variation in position of the by-pass groove under different vehicle load conditions.

When the damper is fully extended, as shown in FIGS. 1A, 1B and 4, the volume of the annular space within the bellows 48 is at its greatest so that the pressure of the air contained therein is at its least. It should be noted also that the volume of liquid in the reservoir 15 is also at its least. Thus the membrane 34 is in the condition shown in FIG. 1A in which the diameter of its thin central cylindrical portion is less than the diameter of its thicker end portions and the volume of the annular area which is enclosed by the membrane 34 is at its least. The non-return valve 53 prevents the pressure of air within the bellows 48 falling below ambient atmospheric pressure and prevents malfunctioning of the bellows due to air leakage from the reservoir. At the same time the effective cross-sectional area of the groove 25 within the piston rod 13 is at its greatest so that the resistance offered by the damping valve 24 to the flow of liquid from the annular cylinder space 21 to the chamber 16 is minimised, a maximum amount of that liquid flow being through that part of the by-pass passage that is defined by the groove 25 and which leads to the liquid reservoir 15.

Inward movement of the piston rod 13, which accompanies an increase in the loading of the vehicle, leads to an increase in the volume of liquid in the reservoir 15 and a reduction in the volume of the interior of the bellows 48 so that the pressure of air above the oil in the reservoir 15 increases. This air pressure increase inflates the membrane 34 until, when the damper is fully contracted, as shown in FIG. 2, the membrane is deformed into the condition shown in FIG. 2 wherein the diameter of the thin central portion is greater than is the diameter of the thicker end portions.

When the damper is midway between its fully extended and fully contracted conditions, as shown in FIG. 4, the effective area of the groove 25 is less than when the damper was fully extended so that the damping valve 24 has a greater influence upon the flow of liquid from the annular cylinder space 21 to the chamber 16. FIG. 3 shows that the groove 25 does not extend through the annular gland 14 when the damper is fully contracted so that all liquid that flows from the cylinder space 21 to the chamber 16 must flow through the damping valve 24.

Figure 5:
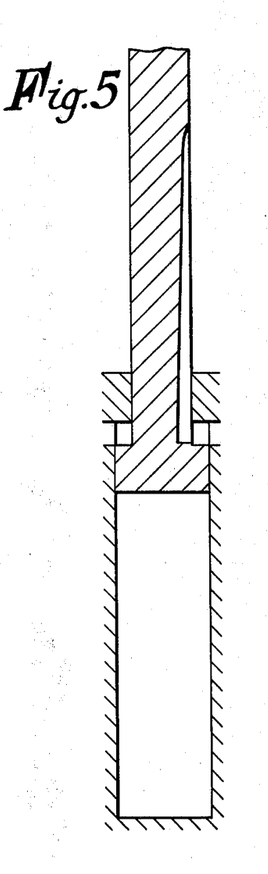
Figure 6:
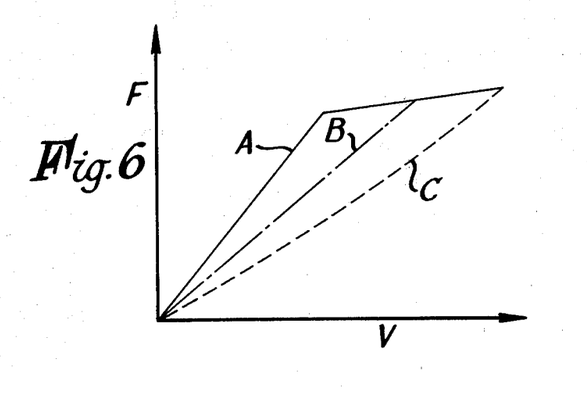
FIG. 6 is a graph showing the changes in damper characteristics resulting from changes of vehicle load.

FIG. 6 shows the damper characteristic curves for the three conditions, full load, half load and no load which apply when the damper is in the condition illustrated respectively in FIGS. 3, 4 and 5. The curves shown in FIG. 6 are applied force F plotted against piston rod velocity V; the full line curve A is that plotted for full load conditions, the chain dotted curve B is that plotted for half load conditions and the dotted curve C is that plotted for no load conditions.

The annular shield 41 shields the membrane 34 from direct sunlight and external mechanical damage. The holes 42 allow moisture or dirt, which might collect between the annular shield 41 and the membrane 34, to escape. These holes 42 also allow air to circulate within the annular space defined between the annular shield and the membrane 34 during reciprocation of the damper so as to assist in cooling the damper.

Various modifications of the specific construction of damper described above with reference to and as shown in FIGS. 1A, 1B and 2 to 6 can be incorporated.

Figure 7:
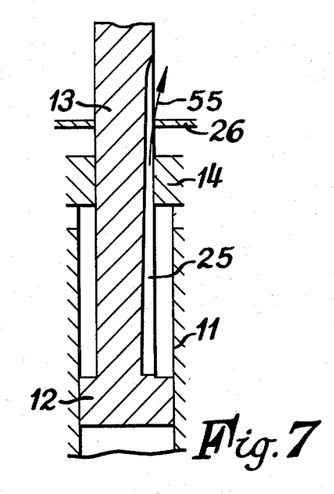
FIGS. 7 and 8 show respectively the path of the liquid flowing from the by-pass into the reservoir of the damper shown in FIGS. 1A, 1B and 2 to 5 with a longitudinal and a helical groove respectively.
Figure 7A:
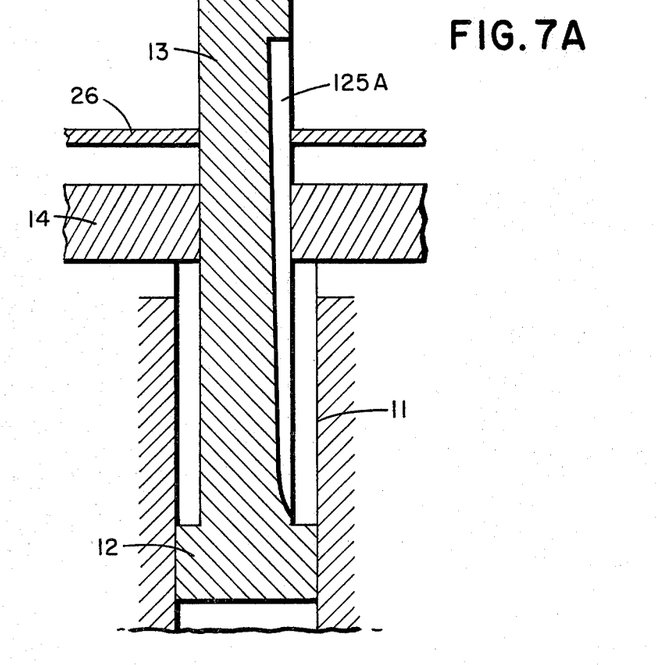
FIGS. 7A and 7B illustrate other embodiments of the invention which are modifications of the embodiment of FIG. 7.
Figure 7B:
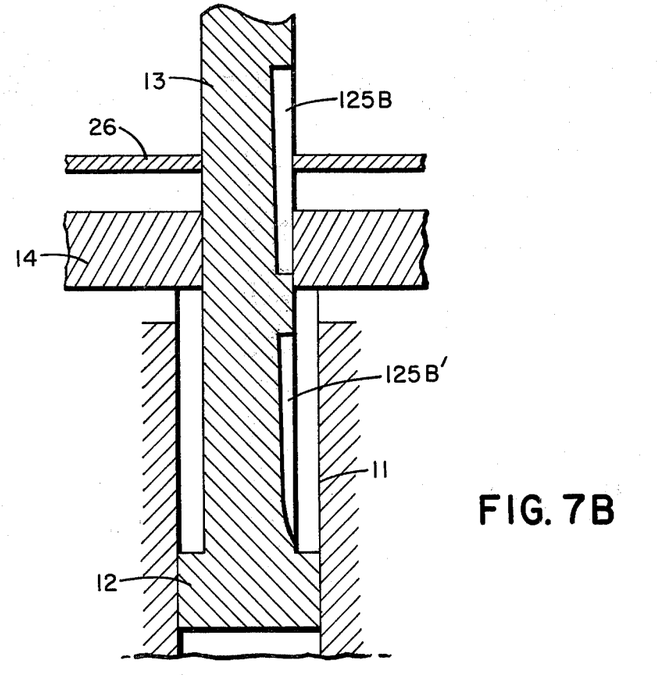
Figure 9:
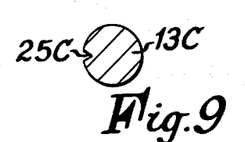
FIGS. 9 and 10 show alternative cross sections of the piston rod of the damper shown in FIGS. 1A, 1B and 2 to 5.
Figure 10:
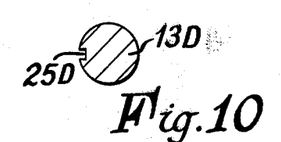
Figure 11:
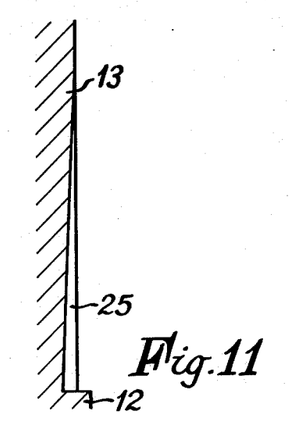
FIGS. 11 and 12 show a respective one of two different forms of longitudinal groove in the piston rod, the depth of the groove shown in FIG. 11 varying progressively and the groove shown in FIG. 12 being stepped.
Figure 12:
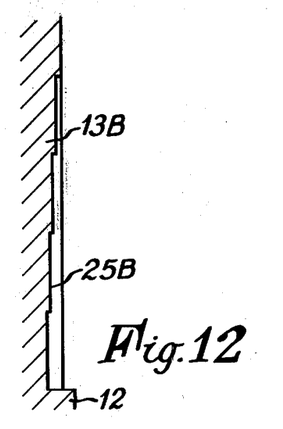

The cross-sectional area of the groove 25 in the piston rod 13 can be varied in steps, either in depth or in width, instead of being varied progressively. FIG. 12 shows a piston rod 13B with a groove 25B which is varied stepwise in depth and this can be compared conveniently with FIG. 11 which, like FIGS. 1 to 5 and 7, shows a groove 25 which decreases in depth progressively away from the piston head 12. The cross-sectional area of groove 125A in FIG. 7A increases progressively along the length of the groove in the direction, away from the piston head and the grooves 125 B, 125B' are shown in FIG. 7B as being spaced longitudinally from each other on the piston rod. Furthermore the groove 25 can be any convenient shape in cross-section. FIG. 9 shows a 'V' section groove 25C formed in a piston rod 13C whilst FIG. 10 shows a channel-section groove 25D formed in a piston rod 13D.

Figure 8:
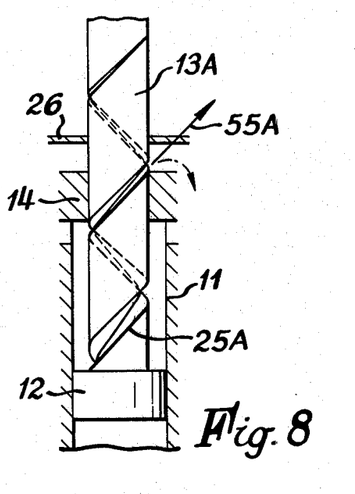

To reduce the aeration of the liquid passing through the by-pass passage, which aeration can be considerable if the liquid is ejected as a jet 55 through the central aperture defined within the base of the cup-shaped component 26 and along the piston rod 13 into the interior of the bellows 48, the groove 25A in the piston rod 13A may be helical (as is shown in FIG. 8) so that the jet 55A issues at a tangent to the piston rod 13A. In such an arrangement the base of the cup-shaped component 26 serves as a deflector ring which leads liquid discharge from the helical groove 25A towards the reservoir 15 via the radial passages defined by the slots 28. Aeration can be further reduced if a number of such helical grooves are provided in the piston rod and arranged in the manner of a multi-start thread so that the total of their cross-sectional areas in any one radial plane along the piston rod equals the cross-sectional area of the single helical groove 25A in the respective plane.

Figure 13:
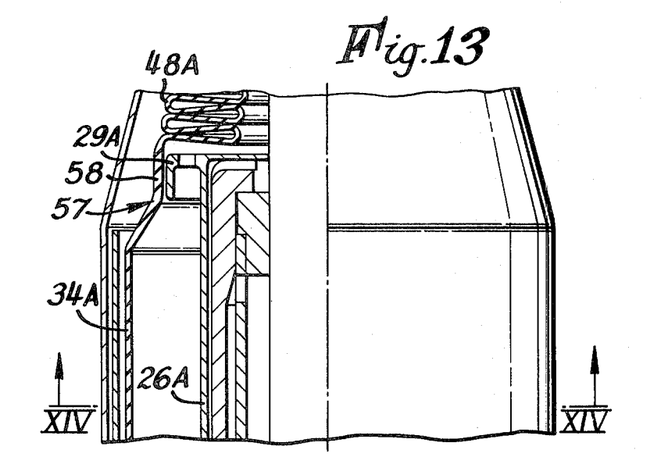
FIG. 13 is a half-sectioned fragment of a modified liquid damper according to this invention which is shown contracted.
Figure 14:
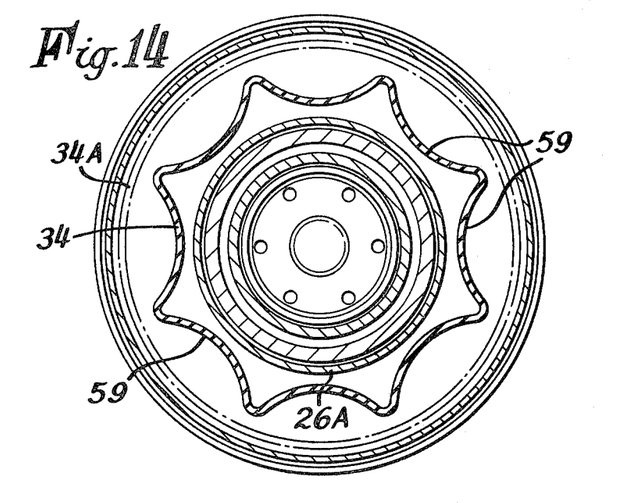
FIG. 14 is a section on the line XIV—XIV of FIG. 13 showing parts of the damper in the condition they adopt when the damper is extended.

The convoluted bellows 48 and the membrane 34 can be formed as a single one-piece moulding. FIGS. 13 and 14 illustrate a damper which incorporate therein a one-piece moulding 57 which comprises the bellows 48A, the membrane 34A and a connecting piece 58. The damper shown in FIGS. 13 and 14 is similar in most other respects to the damper described above. The annular flange 29A, which forms part of the cup-shaped moulded plastic component 26A, is modified so that, rather than serving as structure to which both the membrane and the bellows are clamped, it provides radial support for the cylindrical connecting piece 58 of the one piece moulding 57. Such a flange 29A can be omitted completely if desired.

The membrane 34A differs from that described above with reference to and as shown in FIGS. 1A and 2, in that, instead of being a simple cylindrical membrane which is uniformly deformable in a radial direction by inflation and deflation, it comprises a circumferential series of axially-extending arcuate membrane portions 59 which are deflectable from the condition in which their inner surfaces are convex, as shown in FIG. 14 and which they adopt when the air pressure within the reservoir 15 is low, to the condition, which is shown in FIG. 13, in which their inner surfaces are concave and which prevails when the damper is contracted and the air pressure within the reservoir 15 is high. The degree of stretch in the material of the membrane 34A, when the damper is contracted, is small compared with that of the membrane 34 of the damper which is described above with reference to FIGS. 1A, 1B and 2 to 7 of the accompanying drawings when the latter damper is in a similar condition. The inflated condition of the membrane 34A is shown in chain dotted lines FIG. 14.

The radially deformable membrane 34 can be omitted if an arrangement of bellows is adopted which is able to support the increase in air pressure theran which occurs when the damper is fully contracted. It is thought that, in general, such an arrangement would require the overall diameter of the damper to be unacceptably high. One proposed damper which incorporated such an arrangement differed from the dampers described above with reference to and as shown in the accompanying drawings in that the rigid ring 44, convolute bellows 48, membrane 34 and annular shield 41 were replaced by a second cup-shaped member which lay inside the cup-shaped shield and extended into the reservoir. The base of the second cup-shaped member was mounted on the piston rod 13 and located with respect to the base of the cup-shaped shield 43 in a similar manner to the rigid ring 44 and a similar non-return valve arrangement was provided. A rolling bellows was secured at one end to the rigid cylinder 33 of the reservoir 15 and at its other end to the second cup-shaped member so as to seal the reservoir from the surrounding atmosphere. The base of the second cup-shaped shield was urged towards the base of the cup-shaped shield by a resilient ring, or resilient clips, fixed to the cup-shaped shield and engaging an external flange on the second cup-shaped member.

It is not essential that the variable area by-pass be arranged to reduce the resistance offered by the damping valve to passage of liquid from the annular cylinder space to the liquid reservoir only as the length of the damper increases. In certain circumstances the variable area by-pass could be arranged to function in the reverse, that is the groove decreasing in area towards the piston head, so that the resistance offered by the damping valve to liquid flow from the annular cylinder space to the liquid reservoir increases as the length of the damper increases. Another possible arrangement envisages provision of a groove in the piston rod only along the central portion of the rod or the provision of grooves at each end of the piston rod and not at the centre.

I claim:

1. A liquid damper comprising
   a first cylindrical housing enclosing a chamber having first and second ends,
   a piston slidably disposed for longitudinal movement in the chamber,
   a gland sealing the first end of the chamber,
   a piston rod attached to the piston and slidably disposed through the gland,
   means for flow of fluid through the piston only towards the gland as the piston moves in the chamber,
   a reservoir for storage of fluid adjacent to the second end of the chamber,
   means between the reservoir and the chamber comprising a valve which permits flow of fluid only from the reservoir to the chamber,
   a tubular member about the first housing spaced radially outwardly from the said housing to provide a first annular space,
   a first passageway adjacent to said gland and between the chamber and the first annular space for flow of fluid from the chamber as the piston moves in either direction,
   a second passageway for flow of fluid from the first annular space to said reservoir,
   a damping valve in said second passageway which resists flow of fluid into the reservoir,
   a second housing about said tubular member and radially spaced therefrom to provide a second annular space,
   passageway means for flow of fluid from the second annular space into the reservoir,
   groove means in said piston rod having a cross-sectional area which varies along said piston rod and is disposed on the piston rod where it will enter the chamber as the piston moves away from said gland, said groove means and second annular space combining to form a by-pass for fluid from the chamber around said damper valve into the said reservoir, and
   an annular moveable wall about said piston rod and secured thereto at a point spaced longitudinally from the gland beyond the groove means to form a fluid tight seal and enclose a space about the piston rod.

2. The liquid damper of claim 1 wherein a radially expandable membrane is disposed between said movable wall and the said second annular space.

3. The liquid damper of claim 1 wherein the cross-sectional area of the groove means progressively decreases in the direction away from the piston.

4. The liquid damper of claim 1 wherein the cross-sectional area of the groove means varies step-wise in the direction away from the piston.

5. The liquid damper of claim 1 wherein said tubular member has a radially inwardly extending flange disposed over that end of the gland spaced from the chamber, a cup-shaped member inverted over the flanged end of the tubular member and having a wall spaced radially outwardly from the tubular member which communicates with the said second annular space, and a radial slot between the flanged end of the tubular member and the closed end of the cup-shaped member for flow of fluid from the said groove means to the space between the wall of the cup-shaped member and the tubular member.

6. A liquid damper comprising a piston, which comprises a piston rod and a piston head mounted at one end of the piston rod, and body structure enclosing a cylinder and a liquid reservoir, the cylinder having an annular gland at one end and being closed at the other end, the piston head being a sliding fit within the cylinder and the piston rod being a sliding fit within a central aperture of the annular gland whereby an annular cylinder space is defined between the piston head and the annular gland and a second cylinder space is defined between the piston head and the closed end of the cylinder, a one-way valve in the piston which permits liquid to flow from the second cylinder space to the annular cylinder space, a second one-way valve in the body structure which permits liquid to flow from the liquid reservoir directly to said second cylinder space through said closed other end, passage means in the body structure which connects said annular cylinder space to the liquid reservoir and thereby provides a flow path for liquid displaced from said annular cylinder space by sliding movement of the piston head in either direction within the cylinder to flow to the liquid reservoir, a damping valve which resists the flow through said passage means from said annular cylinder space to the liquid reservoir of liquid that is displaced from said annular cylinder space by sliding movement of the piston head in either direction within the cylinder whereby the damping characteristics of the damper are determined primarily by the resistance to such liquid flow offered by the damping valve, and a by-pass passage which is open at least during a portion of the stroke of the damper to provide a connection between said annular cylinder space and the liquid reservoir in parallel with the flow path through said damping valve and which is arranged to vary in area with change of position of the piston head in the cylinder, one part of the by-pass passage being groove means in the piston rod which extends longitudinally thereof and is of varying cross-section along the piston rod, said groove means extending through said annular gland during displacement of the piston therefrom; an annular moveable wall which is fitted to the piston rod between the end thereof remote from the piston head and said one by-pass passage part so as to surround said piston rod and which cooperates with said body structure to provide a fluid tight boundary for said liquid reservoir, and a second part of the by-pass passage being formed in said body structure, said groove means being connected to the said second part of the by-pass passage when said groove means extends through said annular gland into the cylinder.

7. A liquid damper according to claim 6 wherein the liquid reservoir is annular and surrounds the cylinder.

8. A liquid damper according to claim 6, wherein the improvement further comprises the groove means extending from the piston head along a part of the length of the piston rod so that the groove means is wholly within the cylinder when the piston head is at the closed end of the cylinder but at other parts of the stroke of the piston the groove means extends through the annular gland.

9. A liquid damper according to claim 6, wherein the cross-sectional area of the groove means decreases in steps along the length of the groove means in the direction away from the piston head.

10. A liquid damper according to claim 6, wherein the groove means which is formed in the surface of the piston rod follows a helical path around and along the piston rod.

11. A liquid damper according to claim 16, wherein a deflector ring is mounted in emerges annular space so that a jet of liquid which energes from said by-pass passage impinges upon the deflector ring and is deflected thereby towards the liquid reservoir.

12. A liquid damper according to claim 6, wherein the movable wall includes a deformable wall which is connected in a fluid tight manner at its end remote from the piston rod to that part of the body structure which defines the outer wall of the annular reservoir.

13. A liquid damper according to claim 12, wherein the deformable wall is a bellows.

14. A liquid damper according to claim 13, wherein the bellows comprises a plurality of convolutions arranged in an axially-extending series.

15. A liquid damper according to claim 7, wherein the improvement further comprises the end of the bellows remote from the piston rod being connected by an annular membrane to that part of the body structure which defines the outer wall of the liquid reservoir, the annular membrane being deformable radially, the arrangement being such that the volume of the annular area enclosed by the annular membrane can increase as the bellows contracts.

16. A liquid damper according to claim 15 wherein the annular membrane is composed of a circumferential series of axially-extending arcuate membrane portions, each arcuate membrane portion being deflectable from one condition in which its inner surface is convex to another condition in which its inner surface is concave by an increase in pressure within the annular area that is enclosed by the membrane and being deflectable in the opposite direction by a decrease in the pressure within that annular area.

17. A liquid damper according to claim 15, wherein the bellows and the annular membrane are formed together as one piece.

18. A liquid damper according to claim 6 wherein the cross-sectional area of the groove means decreases progressively along the length of the groove means in the direction away from the piston head.

19. A liquid damper according to claim 6 wherein the cross-sectional area of the groove means increases progressively along the length of the groove means in the direction away from the piston head.

20. The liquid damper of claim 6 wherein said groove means is a plurality of grooves spaced longitudinally from each other on the piston rod.

21. The liquid damper of claim 6 wherein said groove means is spaced longitudinally from the end of the piston rod attached to the piston.

22. A liquid damper comprising a piston, which comprises a piston rod and a piston head mounted at one end of the piston rod, and body structure enclosing a cylinder and a liquid reservoir, the cylinder having an annular gland at one end and being closed at the other end, the piston head being slidably disposed within the cylinder and the piston rod being slidably disposed in a central aperture of the annular gland whereby an annular cylinder space is defined between the piston head and the annular gland and a second cylinder space is defined between the piston head and the closed end of the cylinder when the piston is displaced away from the gland, a one-way valve in the piston which permits liquid to flow from the second cylinder space to the annular cylinder space, a second one-way valve in the body structure which permits liquid to flow from the liquid reservoir directly to said second cylinder space through the closed end wall, passage means in the body structure which connects said annular cylinder space to the liquid reservoir and thereby provides a flow path for liquid displaced from said annular cylinder space by sliding movement of the piston head in either direction within the cylinder to flow to the liquid reservoir, said passage means comprising groove means in said piston rod which extends longitudinally from adjacent the piston head and is of decreasing area as it extends from the piston head, a damping valve which resists the flow through at least a portion of said passage means from said annular cylinder space to the liquid reservoir of liquid that is displaced from said annular cylinder space by sliding movement of the piston head in either direction within the cylinder so that the damping characteristics of the damper are determined primarily by the resistance to such liquid flow by the damping valve, the liquid reservoir being formed within the body structure so as to surround the cylinder, and a deformable annular wall which is fitted to the piston rod between the end thereof remote from the piston head and the annular gland and surrounds said piston rod and which is connected at its end remote from the piston rod in a fluid tight manner to that part of the body structure which forms the outer wall of the liquid reservoir, the deformable wall being connected to that part of the body structure by an annular membrane which is deformable radially, the arrangement being such that the volume of the annular area enclosed by the annular membrane can increase as the volume enclosed by the deformable wall decreases.

23. A liquid damper according to claim 22, wherein the deformable wall is a bellows.

* * * * *